United States Patent
Kuemmel et al.

(10) Patent No.: US 10,320,634 B2
(45) Date of Patent: Jun. 11, 2019

(54) DATA COMMUNICATIONS EMPLOYING PACKET REPORT MESSAGES

(71) Applicant: GetGo, Inc., Fort Lauderdale, FL (US)

(72) Inventors: Sascha Kuemmel, Langebrueck (DE); Gregor Jasny, Dresden (DE); Jupp Mueller, Dresden (DE); Robert Chalmers, Longview, WA (US)

(73) Assignee: LogMeIn, Inc., Boston, MA (US)

( * ) Notice: Subject to any disclaimer, the term of this patent is extended or adjusted under 35 U.S.C. 154(b) by 231 days.

(21) Appl. No.: 15/395,887

(22) Filed: Dec. 30, 2016

(65) Prior Publication Data

US 2018/0191588 A1 Jul. 5, 2018

(51) Int. Cl.
H04L 12/26 (2006.01)

(52) U.S. Cl.
CPC ........ *H04L 43/062* (2013.01); *H04L 43/0829* (2013.01)

(58) Field of Classification Search
None
See application file for complete search history.

(56) References Cited

U.S. PATENT DOCUMENTS

| | | | |
|---|---|---|---|
| 6,732,182 B1 | 5/2004 | Beverly, IV | |
| 2005/0022089 A1* | 1/2005 | Le | H04L 1/0001 714/749 |
| 2005/0081080 A1 | 4/2005 | Bender et al. | |
| 2006/0248582 A1* | 11/2006 | Panjwani | H04L 47/10 726/13 |
| 2009/0019178 A1* | 1/2009 | Melnyk | H04L 47/10 709/233 |
| 2013/0007288 A1 | 1/2013 | Olsen et al. | |
| 2018/0167294 A1* | 6/2018 | Gupta | H04L 43/06 |

* cited by examiner

*Primary Examiner* — Kodzovi Acolatse
(74) *Attorney, Agent, or Firm* — BainwoodHuang

(57) ABSTRACT

In communication between first and second endpoints, packets include respective sequence numbers reflecting a sequential order of transmission. The second endpoint (1) identifies reception times for the packets, and stores the sequence number and reception time of each received packet, and (2) sends packet report messages to the first endpoint, each identifying (i) a respective received packet by its position within the sequential order of transmission of the packets, and (ii) the reception time of the received packet. The first endpoint (1) receives the packet report messages from the second endpoint, and (2) processes the packet report messages to (i) detect missing packets not identified as received in the packet report messages, and initiating re-transmission of the missing packets, and (ii) based on the reception times for the received packets, calculate time-based performance characteristics for the communications link for use in higher-level control of the communications link.

19 Claims, 3 Drawing Sheets

---

50 — 2nd ENDPOINT – DATA RECEIVER

1. IDENTIFY RESPECTIVE RECEPTION TIMES FOR PACKETS, AND STORE, FOR EACH RECEIVED PACKET, THE RESPECTIVE SEQUENCE NUMBER AND RECEPTION TIME

2. SEND PACKET REPORT MESSAGES TO THE 1$^{ST}$ ENDPOINT SYSTEM FOR RESPECTIVE RECEIVED PACKETS, EACH PACKET REPORT MESSAGE IDENTIFYING (I) A RECEIVED PACKET BY ITS POSITION WITHIN THE SEQUENTIAL ORDER, AND (II) THE RECEPTION TIME OF THE RECEIVED PACKET

52 — 1$^{ST}$ ENDPOINT SYSTEM – DATA SENDER

1. RECEIVE THE PACKET REPORT MESSAGES FROM 2$^{ND}$ ENDPOINT

2. PROCESS THE PACKET REPORT MESSAGES TO (I) DETECT MISSING PACKETS SENT TO THE SECOND ENDPOINT SYSTEM AND HAVING NO CORRESPONDING RECEIVED PACKET REPORT, AND INITIATE RE-TRANSMISSION OF THE MISSING PACKETS, AND (II) BASED ON THE RECEPTION TIMES FOR THE RECEIVED PACKETS, CALCULATE ONE OR MORE TIME-BASED PERFORMANCE CHARACTERISTICS FOR THE COMMUNICATIONS LINK FOR USE IN HIGHER-LEVEL CONTROL OF USAGE OF THE COMMUNICATIONS LINK

DATA COMMUNICATIONS EMPLOYING PACKET REPORT MESSAGES

BACKGROUND

The invention relates to the field of data communications, and in particular to apparatus and methods for reliable packet delivery and quality of service (QOS) in data communications.

SUMMARY

Disclosed is an application-level transport protocol and associated functionality for transmitting data, such as media data, between two endpoints. An application-level connection is logical, and supported underneath by one or more network-level transports such as TCP and UDP. Each endpoint of a connection periodically reports on the set of packets previously received using packet report control messages, which specifically identify each received packet and its time of receipt. A series of packet report messages provides a basis for detecting packet loss, driving potential retransmission. It can also be used to derive bandwidth, loss and round-trip time (RTT) statistics for the connection. By taking advantage of the statistics enabled by use of packet reports, packet loss can be detected implicitly without a need for separate acknowledgements (ACKs) and/or negative acknowledgements (NACKs), and flow control can be implemented without requiring separate ACKs.

The reports provide a complete picture of the traffic pattern on the receiver side. They may be generic and make no assumptions about the delivery and reliability characteristic of a specific media channel. This is in contrast to known protocols in which a packet receiver derives such metrics and feedback information from the packets received, and then sends this information back to the sender. Sending the raw information of packet receipt times back to the sender can enable implementation of disparate control mechanisms, because the protocol does not make assumptions regarding metrics, retransmission, congestion or flow control. Compiling a complete picture at the packet level allows individual tailoring of the reliability and QOS of individual channels, with reliability ranging from unreliable to completely reliable, including semi-reliable delivery appropriate for real-time video, for example. Based on Packet Reports, the sender can take actions such as retransmission, adding protection (e.g. forward error correction or FEC), or employing higher-level mechanisms to synchronize/restart a media stream (e.g. alternate reference frames or key frames in case of video).

In particular, a method is disclosed of communication between a first endpoint system and a second endpoint system connected to the first endpoint system by a communications link on which the first endpoint system sends packets to the second endpoint system, wherein the packets include respective sequence numbers reflecting a sequential order of transmission of the packets. The method includes, by the second endpoint system, (1) identifying respective reception times for the packets, and storing, for each received packet, the respective sequence number and reception time, and (2) sending packet report messages to the first endpoint system for respective received packets, each packet report message identifying (i) a received packet by its position within the sequential order of transmission of the packets, and (ii) the reception time of the received packet; and The method further includes, by the first endpoint system, (1) receiving the packet report messages from the second endpoint system, and (2) processing the packet report messages to (i) detect missing packets sent to the second endpoint system and not identified as received in the packet report messages, and potentially re-transmit the missing packets, and (ii) based on the reception times for the received packets, calculate one or more time-based performance characteristics for the communications link for use in higher-level control of usage of the communications link.

In particular embodiments, the first and second endpoints implement a logical connection using an application-level transport on the communications link, and the packets are of the application-level transport and are structured to include a control portion and a channel portion. The first endpoint system sends application data to the second endpoint system in the channel portion of the packets sent to the second endpoint system, and the second endpoint system sends the packet report messages to the first endpoint system as control messages in the control portion of packets sent from the second endpoint system to the first endpoint system. The packet reporting mechanism may employ its own distinct reliability mechanism, including in one example the packet report messages themselves, to promote accurate operation of link reliability and QOS mechanisms that are informed by the information from the packet report messages.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Figure 1:
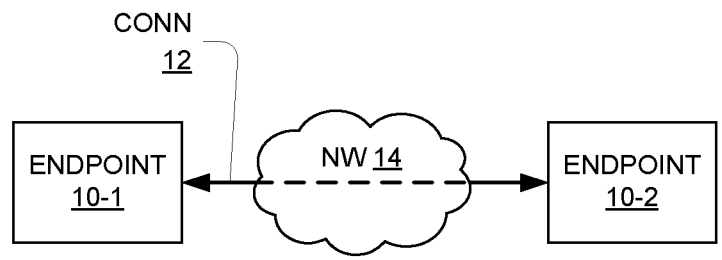
FIG. 1 is a block diagram of a computing system.

FIG. 1 shows a simplified distributed computing system having two endpoints 10 (10-1 and 10-2) coupled by a connection (CONN) 12 extending through a network (NW) 14. In general, the endpoints 10 are respective instances of computer-implemented functionality associated with a distributed application, and the connection 12 is utilized to transfer application data between these network-separated instances. In one general type of application, the endpoints 10 implement media-related functionality such as a video conferencing application, and the connection 12 provides associated communications functionality; however, the techniques described herein have more general applicability.

In particular, the present description focuses on certain aspects of the connection 12 and related functionality of the endpoints 10. In particular, the connection 12 employs an application-layer transport protocol having certain features used in support of reliability and quality-of-service (QOS) aspects of communications. One example of such an application-layer transport protocol is referred to as Audio-Video Transport Protocol or AVTP, useful in media communications environment as mentioned above. Again, it will be appreciated that the features described herein have more general applicability.

Figure 2:
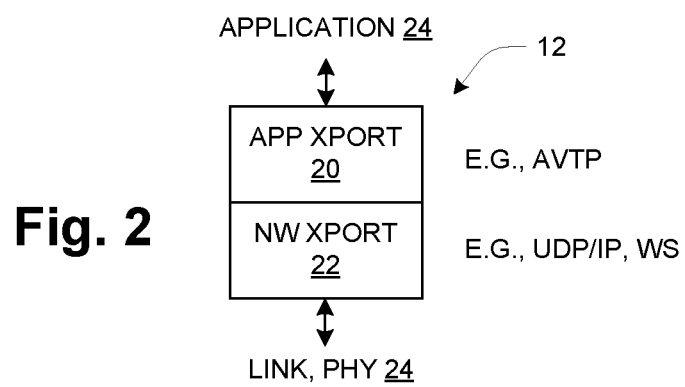
FIG. 2 is a schematic diagram of functional layers of a connection.

FIG. 2 illustrates logical structure of the connection 12, typically realized by corresponding network stacks of the endpoints 10. It includes an application-layer transport (APP XPORT) 20 on top of an underlying network-layer transport (NW XPORT) 22 (referring to the well-known OSI layered model of network structure and operation). The application-layer transport 20 interfaces to an application 24 above (such as video conferencing), and the network-layer transport 22 interfaces to the lower network layers below, such as data link (shown as Link) and physical layer (e.g., copper, fiber, etc.; shown as PHY). Typical network-layer transports 22 are UDP/IP and web sockets (WS) as shown. As mentioned, an example application-layer transport 20 is AVTP, which is a connection-oriented transport protocol that provides one or more media-specific channels for transmitting media between two endpoints 10. For ease of description, the application-layer transport 20 is referred to as "APP-XPORT" herein.

Generally, an APP-XPORT connection is a logical connection, supported underneath by one or more network-transport paths 22, including for example separate TCP and UDP paths. Individual APP-XPORT packets might be routed over any connected path, or might be transmitted over multiple paths simultaneously for the sake of resiliency.

The following are aspects of APP-XPORT 20:
Endpoint: Endpoints are distinct entities that communicate with each other via APP-XPORT connections, either in a peer-to-peer or client-server fashion.
Connection: An APP-XPORT connection is a logical entity that allows two endpoints to communicate with one another. It may be associated with a single cryptographic context. Each connection contains at least one path. In the example of AVTP, a connection may also include zero or more channels, which are described more below.
Path: Connections utilize multiple paths through the network to improve/optimize transport over a range of conditions. Individual paths can use different network protocols (i.e. UDP, TCP, proxies), as well as distinct network addresses for the same two endpoints.
Channel: Channels encapsulate the actual data sent between endpoints in packets. They provide for multiplexed transmission of media-streams over a single connection (data, audio, video), and configurable behavior with respect to packet handling, including for example reliability and forward error correction (FEC)
Packet: A packet is the unit of transmission on a connection. Each packet consists of a packet-header, zero or more messages, and optionally padding.
Message: A message is a component of a packet, providing specific functionality, such as setup/reply, or media-specific data associated with a channel.

Figure 3:
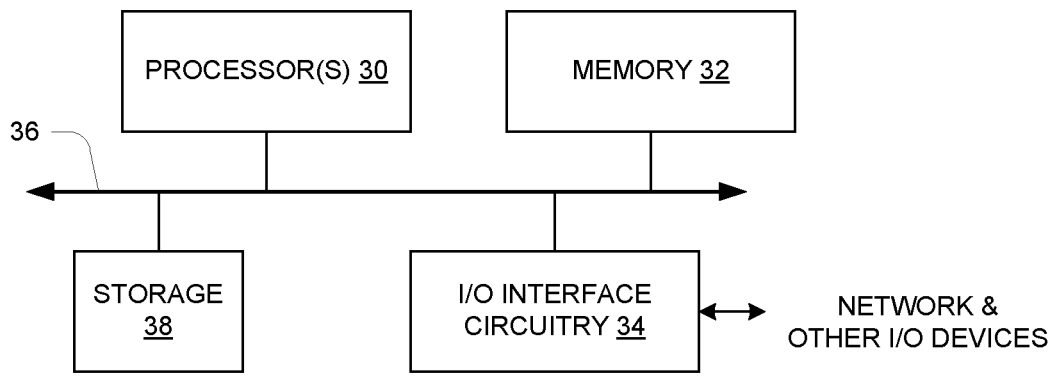
FIG. 3 is a block diagram of a computer from a hardware perspective.

FIG. 3 shows an example configuration of a physical computer or controller from a computer hardware perspective, which may be used to realize the endpoints 10 of FIG. 1. The hardware includes one or more processors 30, memory 32, and interface circuitry 34 interconnected by data interconnections 36 such as one or more high-speed data buses. The interface circuitry 34 provides a hardware connection to the network 14 (FIG. 1) and perhaps other external devices/connections (EXT DEVs). The processor(s) 30 with connected memory 34 may also be referred to as "processing circuitry" herein. As mentioned, there may also be local storage 38 such as a local-attached disk drive or Flash drive. In operation, the memory 34 stores data and instructions of system software (e.g., operating system) and one or more application programs which are executed by the processor(s) 30 to cause the hardware to function in a software-defined manner. Thus the computer hardware executing instructions of a network communications application, such as described herein, can be referred to as a network communications component, and it will be understood that a collection of such components can all be realized and interact with each other as one or more sets of computer processing hardware executing different computer programs as generally known in the art.

Application Transport Architecture

Certain aspects of organization and operation of the application transport (APP-XPORT) are now provided in some detail.

APP-XPORT Packets

All media transmitted between two endpoints is framed within APP-XPORT packets, associated with a specific channel within a single connection. Each packet, however, is not necessarily specific to a channel. Rather, a single packet may carry media from multiple channels simultaneously, loosely modeled as media-slots within the packet. Each slot may be represented as a separate APP-XPORT message which identifies the associated channel and frames the media with an explicit length. Protocol feedback and control are handled in a similar manner, represented as separate messages within the packet.

Each APP-XPORT packet is composed of a Packet Header followed by zero or more messages, grouped into two distinct message-chains. Padding may be added to the end of the packet, following the last message. Packets may be encrypted, and are preferably digitally signed to establish authenticity.

Figure 4:
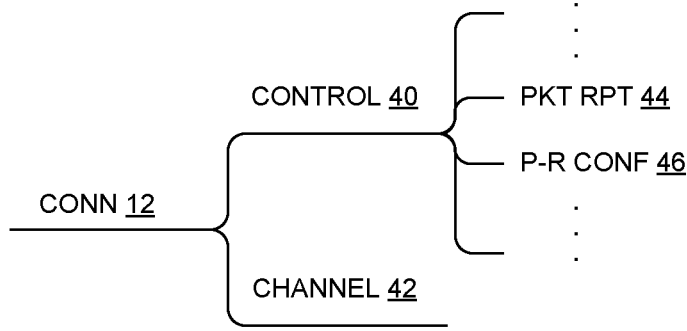
FIG. 4 is a schematic diagram of logical parts of a connection.

Each message-chain consists of a sequence of messages, logically grouped by their associated functionality. Each chain occurs, no more than once, in the following order within the packet:
Control Messages—setup and control of the associated connection and its paths
Channel Messages—channel setup and the associated media FIG. 4 illustrates the above structure. The connection 12 logically includes a control part 40 (control messages) and a channel part 42 (channel messages). The remainder of FIG. 4 is described below.

A complete APP-XPORT packet has a maximum size, such as 1462 bytes (MAX PDU) to improve the chance that any packet can be sent safely over UDP without additional fragmentation or framing. It is the channel's responsibility to properly segment a larger media-stream, if applicable, across multiple APP-XPORT packets.

APP-XPORT supports message-based transports (UDP or WS). Each transport-level message preferably contains exactly one APP-XPORT packet without an explicit length defined. Since the message itself provides the total length, no length value is included the Packet Header.

In one embodiment, all APP-XPORT headers and messages are encoded in network-byte order. Accordingly, bit-fields are described herein from most-significant to least-significant bit. All reserved fields may be set to zero, and ignored upon receipt.

Anything following the packet-header and messages within a packet is considered padding and ignored by the receiver. Any padding should be randomly generated to thwart known-plaintext attacks.

Packet Header

Every APP-XPORT packet begins with a valid APP-XPORT Packet Header having the following fields:

packet (1-byte):
    idType (2-bit)
    encrypted (1-bit)
    controlChain (1-bit)
    channelChain (1-bit)
    reserved (3-bit)
connectionId (variable) [idType>0]
sequenceNumber (2-byte)
timestampMs (2-byte)

The idType (2-bit) indicates the size of the specified connectionId, if any, that associates the packet with a specific APP-XPORT connection. When possible, smaller ids should be employed as a shorthand for a full UUID that uniquely identifies the connection. Endpoints support the following types defining the associated size of an identifier:

| Value | Id Type | Size |
| --- | --- | --- |
| 0 | none | 0-byte |
| 1 | uuid | 16-byte |
| 2 | byte | 1-byte |
| 3 | short | 2-byte |

The encrypted bit is set for encrypted APP-XPORT packets, and unset otherwise. When set, everything following the sequenceNumber is encrypted (e.g., using AES). The two flags, controlChain and channelChain, indicate the presence of each associated message-chain. If a particular flag is set, one or more messages is present for that chain, and the individual chains follow in succession, as already described. The last message in each chain has a "lastMessage" bit set, as described below.

The sequenceNumber is a monotonically increasing counter (e.g., 2 bytes) specific to a single endpoint within a single connection. The sequenceNumber preferably begins with zero for each new connection, and is incremented for each subsequent packet sent over that connection. Packets themselves are never retransmitted. Rather, a non-received APP-XPORT packet is given a new sequenceNumber and sent as a new packet. The same packet may be sent over multiple paths for resilience to loss.

The timestampMs represents when the sender first created the packet, encoded as milliseconds since the epoch. It is assigned a monotonically increasing value that approximates wall-clock time. Timestamps are important for round trip time (RTT) estimation, as well as media-synchronization and playback; thus, the most accurate time-source available should be employed.

Internally, the sequenceNumber and timestampMs should be treated as full 64-bit values. For transmission, however, the lowest 16-bits are specified in the Packet Header. The receiving endpoint reconstitutes the full 64-bit value, properly handling any wrap-around conditions.

Packet Messages

Each message starts with a simple (1-byte) header that indicates the type of message, as well as whether it's the last in a chain of messages. Each chain, if present, MUST end with a message with its lastMessage-bit set.

message (1-byte):
    messageType (5-bit)
    reserved (2-bit) [type-specific]
    lastMessage (1-bit)

The specific format of the header differs between the control and channel chains, as described in the remainder of this section.

Channel Media

APP-XPORT 20 provides messages for sending media-content, and may employ multiple message types each customized for particular use-cases. In one example, media can be sent as a single frame, a sequence of frames, or as extended frame-fragments. The latter message provides a more feature-rich format that also allows for larger frame-sizes. The first two messages are intended for simpler interactions, such as sending a series of small audio-frames, with a focus on minimizing per-message overhead.

Each frame represents a finite block of media-content. Media streams then consist of a sequence of such frames, each identified by a monotonically increasing frameSequence (64-bit). Subsequent frames may be assigned subsequent frameSequence values, although the frameSequence may represent the location within a byte-stream.

When transporting frames, the 64-bit frameSequence can be mapped to an 8-bit frameNumber (low-order byte), providing a sliding window for transmission. Thus, no more than 256 frames may be outstanding, waiting to be acknowledged. Once acknowledged, frameNumbers may be reused, and wrapping should be handled appropriately.

The following is an example organization of a media-carrying frame message, in this case a ChannelFrame message for a single frame:

channel (1-byte)
    messageType (5-bit) [code for ChannelFrame]
    idType (2-bit)
    lastMessage (1-bit)
    channend (variable) [idType>0]
frameNumber (1-byte)
frameLength (1-byte)
frameContent (1-byte*frameLength)

Control Messages

Control Messages pertain to the connection as a whole, or potentially a specific path supporting that connection. All Control Messages should be repeated in every packet sent until explicitly confirmed, indicating that the message has indeed been received. For some messages, such as channel and path setup, it may be required that the message be sent with each packet until confirmed. In other cases, the sender may choose to resend messages with each packet, periodically, or based on particular events.

Each Control Message starts with a (1-byte) header that indicates the type of message, as well as whether it's the last in the chain of Control Messages.

control (1-byte):
    messageType (5-bit)
    reserved (2-bit) [=0]
    lastMessage (1-bit)

All APP-XPORT endpoints support several control messageTypes. Of particular interest in this description are the following:

PacketReport—Provides a report on all packets recently received

PacketReportConfirm—Confirms receipt of the most recent packet report

Referring again to FIG. 4, the above structure is shown as part of the control part 40, which has a variety of messageTypes including PacketReport (PKT RPT) 44 and PacketReportConfirm (P-R CONF) 46.

Many Control Messages, such as PacketReport, have an associated confirmation message (e.g., PacketReportConfirm) which provides the basis for reliable delivery. Each version of such messages is assigned a message-specific sequence-number (8-bit) that is reflected in the associated confirmation. The following sequenced message header is used for such control messages:

control (1-byte):
   messageType (5-bit)
   reserved (2-bit) [=0]
   lastMessage (1-bit)
   messageSequence (1-byte)

The first message of a given type should be assigned a messageSequence of zero, and the messageSequence should be incremented by one for each new message sent. When re-sending a message, however, the messageSequence is not incremented. Any old messages received out-of-order should be discarded and should not be confirmed. Any wrap-around of messageSequence must be handled appropriately, modeling a full 64-bit sequence-number end-to-end.

Packet Reports

In APP-XPORT, each endpoint of a connection periodically reports on the set of packets previously received in the form of a PacketReport Control message 44, identifying each packet's sequenceNumber and the time it was received. This series of PacketReport messages 44 provides the basis for detecting packet loss, driving potential retransmission. PacketReports 44 can also be used to derive bandwidth, loss and RTT statistics for the connection. PacketReport messages 44 are preferably sent regularly, e.g., at no less than once per second.

The following is the structure of a PacketReport message 44 in one embodiment:

PacketReport
  control (1-byte):
    messageType (5-bit) [code for PacketReport]
    reserved (2-bit)
    lastMessage (1-bit)
  messageSequence (1-byte)
  previousSequence (1-byte)
  packetSequence (2-byte)
  packetDelay (2-byte)
  reportBlocks (variable)

Each PacketReport 44 contains a monotonic messageSequence (1-byte), as well as previousSequence (1-byte) which is a reference to a preceding messageSequence that has been positively confirmed, or left zero until the first such confirmation is received. All PacketReports 44 with the same previousSequence should contain a potentially growing set of reports that represent all packets received since previousSequence was sent, providing resilience to packet loss.

The packetSequence (2-byte) contains the sequenceNumber from the most recently received APP-XPORT packet, and packetDelay (2-byte) represents the time (ms) between receiving that packet and sending this report. This provides a means for effectively calculating the round-trip time (RTT) between endpoints.

Each PacketReport 44 contains at least one reportBlock which describes an ordered set of packets that have been received. The last such block in the report MUST have its lastBlock-bit set, creating a chain of neighboring reportBlocks.

The following is the structure of a reportBlock:
control (1-byte)
  reportType (2-bit)
  reportCount (5-bit) [>0]
  lastBlock (1-bit)
reportList (variable*reportCount)

The reportCount (5-bit) of each reportBlock indicates the number of reports in reportList (which is less than 32). Each report in the list represents the time at which a corresponding particular packet, as identified by its sequenceNumber, was received. The format of each report conforms to a specific reportType (2-bit) as follows:

| Value | Report Type | Report Size | Report Format |
|---|---|---|---|
| 0 | ReportLong | 16-byte | time (64-bit), packetSequence (64-bit) |
| 1 | ReportShort | 16-bit | timeDiff (12-bit), packetDiff (4-bit) |
| 2 | ReportTimes | 8-bit | timeDiff (8-bit), packetDiff [=1] |

The use of ReportShort and ReportTimes are an optimization that may not be required in all embodiments. Long encoding would be sufficient for packet reports to be correct, but the additional encodings allow for reduced protocol overhead A ReportLong [0] consists of a complete list of 64-bit pairs, each including a sequence number for a received packet and the time the packet was received. A ReportShort [1] offers a more compact differential format, representing each packet and its reception time in terms of differences from the preceding report. A ReportTimes [2] references only times, and can be used to report on reception of sequential packets, i.e., the identification of the packet(s) is implied as the packets in sequence since the last report.

The first report/block of a PR message is a Long report, but others need not be. ReportShorts continue the sequenceNumber from the last packet in the previousSequence's reportList, expressed as a 4-bit value packetDiff. ReportLongs may be sent periodically to ensure proper alignment of subsequent ReportShorts.

Once received, a more recent PacketReport message is confirmed by sending an associated PacketReportConfirm Control message with a matching messageSequence. A confirmation should be sent for repeated messages, but should not be sent for older messages received with an earlier messageSequence.

Packet Report Confirmations

The following is the structure of a PacketReportConfirm Message used to confirm the receipt of PacketReports:
control (1-byte)
  messageType (5-bit) [code for PacketReportConfirm]
  reserved (2-bit) [=0]
  lastMessage (1-bit)
  messageSequence (1-byte)

Endpoint Behavior

This section describes certain relevant behaviors of the endpoints 10, some of which may be optional and thus not necessarily present in all embodiments. The behaviors and their use may be governed by policies or rules which may be implicit or explicit (i.e., described in a machine-readable way and made available to the respective endpoint(s) for use).

A PacketReport sender implements a scheme for sending PacketReport messages. They may be sent periodically (e.g., every 500 ms) as a general matter, with the period being either fixed or perhaps variable, to accommodate different packet reception rates. There is a trade-off between latency and efficiency, with low latency promoted by a higher report rate and greater efficiency being achieved with a lower report rate. PacketReport messages may be specifically triggered when a packet is recognized as being lost, which would be detected as a gap in the packetSequence numbers of a stream of received packets. The packet receiver stores the packetSequence and time of reception for each packet received, so that this information is available to generate a packetReport when desired.

Every Packet Report contains a (logical) 16-bit sequence number and a reference, previousSequence, to the preceding Packet Report. Multiple Packet Reports can have the same previousSequence value, and any that do have the same value form a report group. The following rules may be used:

- A Packet Report within the same group as its predecessor contains also all its reports and at least one additional one.
- Only the most recent Packet Report of a group is kept for retransmission
- A new group is created if one of the following conditions apply:
  - An acknowledge for one of the group member is received
  - The group is full (no more entries can be added)
- The transmission form (long, short, times only) can vary within one group Regarding retransmission of PacketReport messages, there may be two distinct modes of operation:

Mode 1 for normal operation (no lost Packet Report messages)

Mode 2 for retransmissions

After one Packet Report is sent, the sender waits for a predetermined period (e.g., at least RTT+40 ms) for a confirmation. If no confirmation is received within that time, the PacketReport message is retransmitted and the sender switches to Mode 2. In this mode, the sender also retransmits all PacketReport messages when a new one is sent. A transition from Mode 2 to Mode 1 is performed if a confirmation is received within the predetermined period and the initial transmission time of every other Packet Report message is within the same time range.

If multiple PacketReport messages are marked for retransmission, the one with the lowest sequence number is preferably retransmitted first. When the sender generates a new PacketReport message, it should forget all lower-sequenced ones in this group. Only the newest group member is retransmitted.

A PacketReport receiver implements a scheme for processing and responding to PacketReport messages, for both reliability (packet loss) and quality of service (QOS) aspects of the communications. First, it must send PacketReport-Confirm messages for the associated PacketReports it receives. These confirmation messages may be sent by themselves or included in packets carrying PacketReports or other control-type packets going back the other way (to the PacketReport sender). With the information from the packetReports, a packet sender has the ability to detect non-reception of a packet, and then take appropriate action. The action may vary depending on the level of reliability being provided, which could range from reliable (guaranteed transmission) all the way to unreliable (best efforts only, no guarantee). For reliable service, the action would be retransmission of the packet contents.

Regarding QOS, a PacketReport message receiver may use the information in these messages for calculating aspects of performance, which then may be used in some higher-level process that might affect usage of the communications link. For example, transmission latencies can be calculated, and if they are outside of some predetermined range or have suddenly increased then an alert can be generated and remedial action taken. Another possibility is to calculate actual utilized bandwidth, which can be compared with an agreed or target value to determine whether QOS is acceptable. Broadly, these are time-based performance characteristics for the communications link, whose calculation can be used in higher-level control of usage of the communications link. There may also be non-time-based characteristics that can be detected, such as patterns of packet loss. It might be useful to distinguish bursts of packet loss from more sporadic loss.

Operation—General and Example

Figure 5:
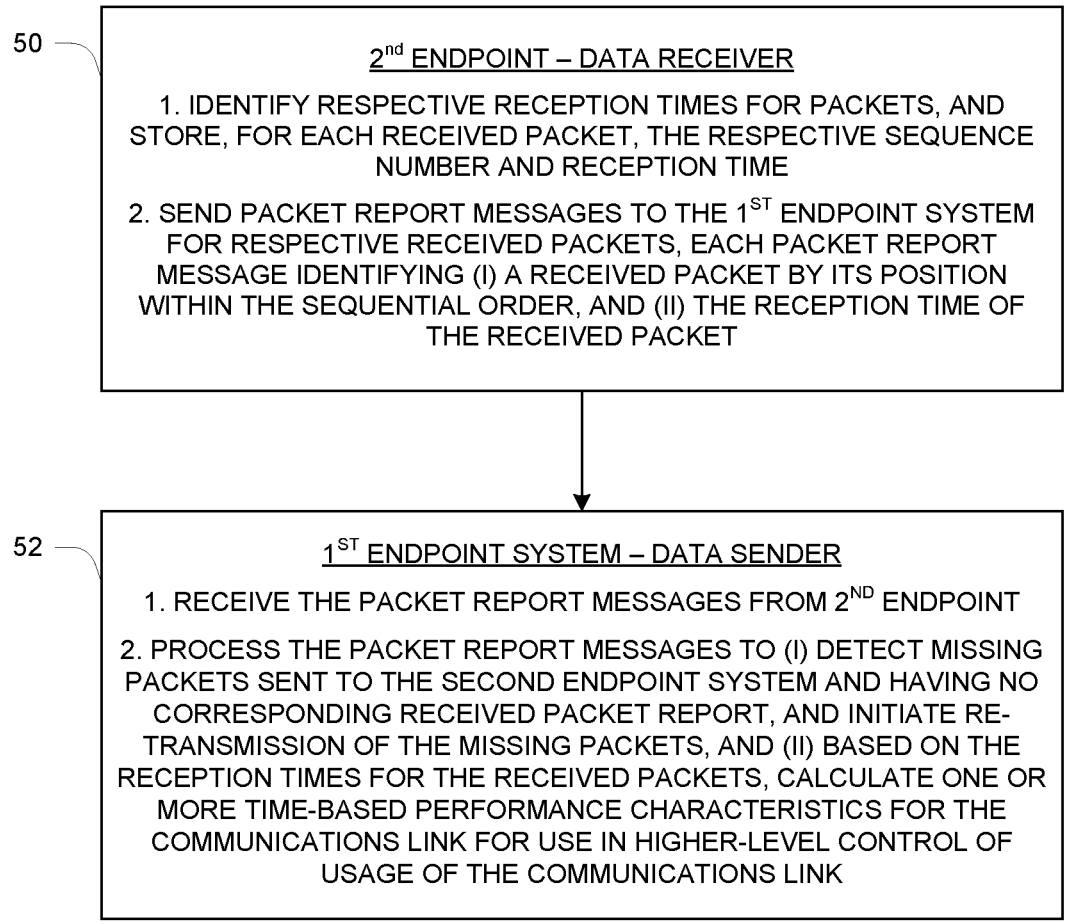
FIG. 5 is a flow diagram of general operation.

FIG. 5 illustrates general operation of the endpoints 10 in connection with packet reporting. For this description, there is a first endpoint (e.g., 10-1) sending application data (e.g., media frames) to a second endpoint (e.g., 10-2), and the second endpoint generates the packet report messages and sends them to the first endpoint.

At 50 are operations of the second endpoint system (e.g., 10-2), which is the receiver of packets carrying application data. Operations include (1) identifying respective reception times for the packets, and storing, for each received packet, the respective sequence number and reception time, and (2) sending packet report messages (e.g., PacketReports) to the first endpoint system for respective received packets, each packet report message identifying (i) a received packet by its position within the sequential order, and (ii) the reception time of the received packet.

At 52 are operations of the first endpoint system (e.g., 10-1), which is the sender of the application data. Operations include (1) receiving the packet report messages from the second endpoint system, and (2) processing the packet report messages to (i) detect missing packets sent to the second endpoint system and having no corresponding received packet report, and initiating re-transmission of the application data carried in the missing packets, and (ii) based on the reception times for the received packets, calculate one or more time-based performance characteristics for the communications link for use in higher-level control of usage of the communications link.

Figure 6:
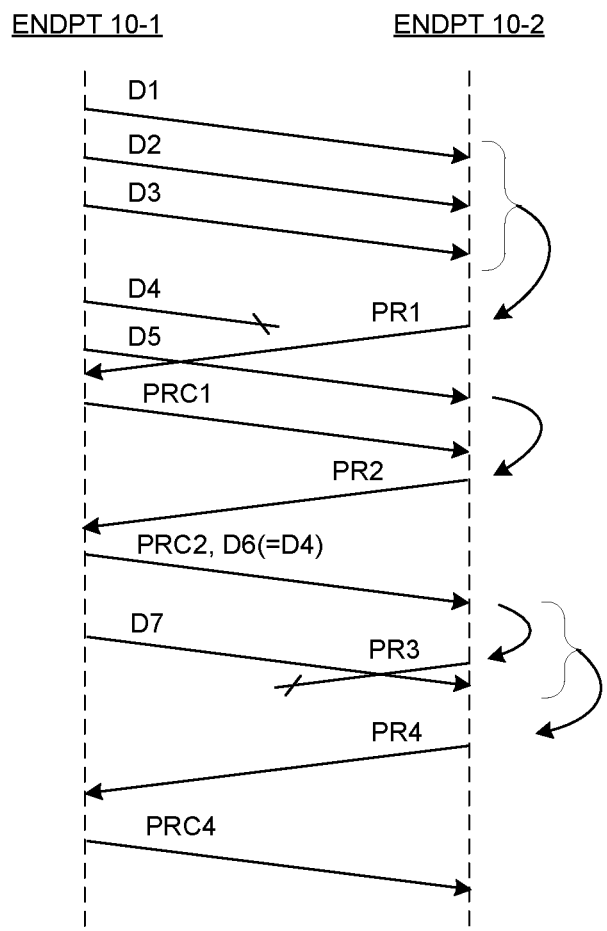
FIG. 6 is a message flow diagram for an example interaction between endpoints.

FIG. 6 presents an illustrative simplified example of an exchange between first and second endpoints 10-1, 10-2, in the form of a message flow diagram in which time progresses downwardly. Initially, endpoint 10-1 sends three data-carrying packets D1-D3 in quick succession, and the endpoint 10-2 responds with a first packet report message PR1 that confirms receipt of all three (i.e., it includes a report block with individual reports for all three packets D1, D2 and D3). The endpoint 10-1 confirms PR1 by sending a first packet report confirmation PRC1.

At about the same time, the endpoint 10-1 is also sending two new packets D4 and D5. It is assumed that D4 is never received by endpoint 10-2. At some time after receiving D5, endpoint 10-2 sends a second packet report PR2 confirming receipt of D5. The endpoint 10-1 notices the gap in the packet reports and the fact that no report is received for D4, and thus the contents of original D4 as D6, along with a second packet report confirmation PRC2 for PR2. Note that the confirmation PRC2 may be included as a control message in the same packet carrying the original D4 contents.

The endpoint 10-2 sends a third packet report message PR3 for D6, but it is not received by the endpoint 10-1. After waiting a predetermined period without receiving a confirmation, endpoint 10-2 shifts into Mode 2 and re-sends PR3 as a fourth packet report message PR4. This is confirmed by the endpoint 10-1 sending a corresponding fourth confirmation PRC4.

While various embodiments of the invention have been particularly shown and described, it will be understood by those skilled in the art that various changes in form and details may be made therein without departing from the scope of the invention as defined by the appended claims.

What is claimed is:

1. A method of communication between a first endpoint system and a second endpoint system connected to the first endpoint system by a communications link on which the first endpoint system sends packets to the second endpoint system, the packets including respective sequence numbers reflecting a sequential order of transmission of the packets, the method comprising:

by the second endpoint system, (1) identifying respective reception times for the packets, and storing, for each received packet, the respective sequence number and reception time, and (2) sending packet report messages to the first endpoint system for respective received packets, each packet report message identifying (i) a received packet by its position within the sequential order of transmission of the packets, and (ii) the reception time of the received packet; and by the first endpoint system, (1) receiving the packet report messages from the second endpoint system, and (2) processing the packet report messages to (i) detect missing packets sent to the second endpoint system and not identified as received in the packet report messages, and initiating re-transmission of the missing packets, and (ii) based on the reception times for the received packets, calculate one or more time-based performance characteristics for the communications link for use in higher-level control of usage of the communications link, wherein the first and second endpoints implement a logical connection using an application-level transport on the communications link, and wherein the packets are of the application-level transport and are structured to include a control portion and a channel portion, and wherein (1) the first endpoint system sends application data to the second endpoint system in the channel portion of the packets sent to the second endpoint system, and (2) the second endpoint system sends the packet report messages to the first endpoint system as control messages in the control portion of packets sent from the second endpoint system to the first endpoint system, and wherein the packet report messages have structure including a variable number of reports along with a report-count identifying a number of reports included in a respective packet report message, each report identifying a respective received packet and the reception time thereof.

2. The method of claim 1, wherein the reports of a packet report message are included in a report block of the packet report message and relate to an ordered set of packets that have been received.

3. The method of claim 2, wherein the packet reports have a variable structure according to distinct report types including a long report, a short report, and a times report, the report type for a given report being identified in a control field of the report, the long report including full-length values for a packet sequence number and a reception time, the short report including differential values for a packet sequence difference and a time difference relative to a preceding report, and the times report including a differential value for the time difference relative to a preceding report and implicitly identifying a respective packet as immediately following the packet for the preceding report in the sequential order of transmission.

4. The method of claim 3, wherein the second endpoint uses the distinct report types as follows:

issuing long reports until a first-sent long report has been confirmed as received by the first endpoint, and then switches to issuing short reports and times reports referring to previously confirmed reports;

issuing a short report when at least one previously sent packet report message has not yet been confirmed as received by the first endpoint system; and issuing a times report when reporting receipt of packets sequentially following a packet identified as received in a preceding packet report message confirmed as received by the first endpoint system.

5. The method of claim 1, wherein the packet reporting of the packet report messages is protected by a distinct reliability protocol in which the packet report messages include respective packet report sequence numbers, and the first endpoint responds to each packet report message by sending a packet report confirmation message including the packet report sequence number of a corresponding packet report message that has been received.

6. The method of claim 5, wherein each packet report message contains a strictly monotonic messageSequence as well as a previousSequence which is a reference to a messageSequence of a preceding packet report message that has been positively confirmed.

7. The method of claim 6, wherein the second endpoint sends new packet report messages without waiting for confirmation of receipt of all preceding packet report messages, and wherein multiple new packet report messages (1) each include the same previousSequence to refer a same preceding packet report message that has been confirmed, and (2) contain a potentially growing set of reports that represent all packets received since the preceding packet report message containing previousSequence was sent.

8. The method of claim 7, wherein the first endpoint sends each packet report confirmation message as a control message in the control portion of the logical connection of the application-level transport.

9. The method of claim 1, wherein each packet includes a packet header followed by messages grouped into two distinct message-chains for the control portion and channel portion respectively, each message-chain having a sequence of messages logically grouped by associated functionality, a control message-chain including control messages related to setup and control of the logical connection, a channel message-chain including channel messages related to setup and usage of channels used to deliver application data.

10. The method of claim 1, wherein the application-level transport is logically above a network-level transport used in the communications link, and the packets of the application-level transport are carried in respective frames or packets of the network-level transport.

11. A method of operating a second endpoint system connected to a first endpoint system by a communications link on which the first endpoint system sends packets to the second endpoint system, the packets including respective sequence numbers reflecting a sequential order of transmission of the packets, the method comprising:

identifying respective reception times for the packets, and storing, for each received packet, the respective sequence number and reception time; and sending packet report messages to the first endpoint system for respective received packets, each packet report message identifying (i) a received packet by its position within the sequential order of transmission of the packets, and (ii) the reception time of the received packet, wherein the first and second endpoints implement a logical connection using an application-level transport on the communications link, and wherein the packets are of the application-level transport and are structured to include a control portion and a channel portion, and wherein (1) the first endpoint system sends application data to the second endpoint system in the channel portion of the packets sent to the second endpoint system, and (2) the second endpoint system sends the packet report messages to the first endpoint system as control messages in the control portion of packets sent from the second endpoint system to the first endpoint system, and wherein the packet report messages have structure including a variable number of reports along with a report-count identifying a number of reports included in a respective packet report message, each report identifying a respective received packet and the reception time thereof.

12. The method of claim 11, wherein:

the reports of a packet report message are included in a report block of the packet report message and relate to an ordered set of packets that have been received; and the packet reports have a variable structure according to distinct report types including a long report, a short report, and a times report, the report type for a given report being identified in a control field of the report, the long report including full-length values for a packet sequence number and a reception time, the short report including differential values for a packet sequence difference and a time difference relative to a preceding report, and the times report including a differential value for the time difference relative to a preceding report and implicitly identifying a respective packet as immediately following the packet for the preceding report in the sequential order of transmission.

13. The method of claim 12, wherein the second endpoint uses the distinct report types as follows:

issuing long reports until a first-sent long report has been confirmed as received by the first endpoint, and then switches to issuing short reports and times reports referring to previously confirmed reports;

issuing a short report when at least one previously sent packet report message has not yet been confirmed as received by the first endpoint system; and issuing a times report when reporting receipt of packets sequentially following a packet identified as received in a preceding packet report message confirmed as received by the first endpoint system.

14. The method of claim 11, wherein:

the packet reporting of the packet report messages is protected by a distinct reliability protocol in which the packet report messages include respective packet report sequence numbers, and the first endpoint responds to each packet report message by sending a packet report confirmation message including the packet report sequence number of a corresponding packet report message that has been received;

each packet report message contains a monotonic messageSequence as well as a previousSequence which is a reference to a messageSequence of a preceding packet report message that has been positively confirmed; and the second endpoint sends new packet report messages without waiting for confirmation of receipt of all preceding packet report messages, and wherein multiple new packet report messages (1) each include the same previousSequence to refer a same preceding packet report message that has been confirmed, and (2) contain a potentially growing set of reports that represent all packets received since the preceding packet report message containing previousSequence was sent.

15. The method of claim 11, wherein each packet includes a packet header followed by messages grouped into two distinct message-chains for the control portion and channel portion respectively, each message-chain having a sequence of messages logically grouped by associated functionality, a control message-chain including control messages related to setup and control of the logical connection, a channel message-chain including channel messages related to setup and usage of channels used to deliver application data.

16. The method of claim 11, wherein the application-level transport is logically above a network-level transport used in the communications link, and the packets of the application-level transport are carried in respective frames or packets of the network-level transport.

17. A method of operating a first endpoint system connected to a second endpoint system by a communications link on which the first endpoint system sends packets to the second endpoint system, the packets including respective sequence numbers reflecting a sequential order of transmission of the packets, the method comprising:

receiving the packet report messages from the second endpoint system for respective packets received by the second endpoint system, each packet report message identifying (i) a received packet by its position within the sequential order of transmission of the packets, and (ii) the reception time of the received packet; and processing the packet report messages to (i) detect missing packets sent to the second endpoint system and not identified as received in the packet report messages, and initiating re-transmission of the missing packets, and (ii) based on the reception times for the received packets, calculate one or more time-based performance characteristics for the communications link for use in higher-level control of usage of the communications link, wherein the first and second endpoints implement a logical connection using an application-level transport on the communications link, and wherein the packets are of the application-level transport and are structured to include a control portion and a channel portion, and wherein (1) the first endpoint system sends application data to the second endpoint system in the channel portion of the packets sent to the second endpoint system, and (2) the second endpoint system sends the packet report messages to the first endpoint system as control messages in the control portion of packets sent from the second endpoint system to the first endpoint system, and wherein the packet report messages have structure including a variable number of reports along with a report-count identifying a number of reports included in a respective packet report message, each report identifying a respective received packet and the reception time thereof.

18. The method of claim 17, wherein each packet includes a packet header followed by messages grouped into two distinct message-chains for the control portion and channel portion respectively, each message-chain having a sequence of messages logically grouped by associated functionality, a control message-chain including control messages related to setup and control of the logical connection, a channel message-chain including channel messages related to setup and usage of channels used to deliver application data.

19. The method of claim 17, wherein the application-level transport is logically above a network-level transport used in the communications link, and the packets of the application-level transport are carried in respective frames or packets of the network-level transport.

* * * * *